United States Patent [19]

Brenner et al.

[11] 4,173,695

[45] Nov. 6, 1979

[54] ALKYL AMMONIUM IONOMERS

[75] Inventors: Douglas Brenner, Livingston; Alexis A. Oswald, Mountainside, both of N.J.

[73] Assignee: Exxon Research & Engineering Co., Florham Park, N.J.

[21] Appl. No.: 924,966

[22] Filed: Jul. 17, 1978

Related U.S. Application Data

[63] Continuation-in-part of Ser. No. 788,312, Apr. 18, 1977, Pat. No. 4,102,876.

[51] Int. Cl.$^2$ .................. C08G 75/00; C08L 19/00
[52] U.S. Cl. .................. 526/332; 525/333; 525/334; 525/335; 525/353
[58] Field of Search .................. 526/30, 40, 19, 20, 526/21, 22

[56] References Cited

U.S. PATENT DOCUMENTS

| | | | |
|---|---|---|---|
| 3,577,357 | 5/1971 | Winkler | 260/22 R |
| 3,867,319 | 2/1975 | Lundberg | 260/30.6 R |
| 3,947,387 | 3/1976 | Lundberg | 521/150 |
| 4,007,149 | 2/1977 | Burton et al. | 526/40 |
| 4,014,831 | 3/1977 | Bock et al. | 260/23 AR |

*Primary Examiner*—Ronald W. Griffin
*Attorney, Agent, or Firm*—Richard E. Nanfeldt

[57] ABSTRACT

Ionomers comprising higher alkyl ammonium or quaternary polyammonium salts of polyacids, particularly sulfonic acids, having anionic groups covalently bonded to carbon atoms comprising a backbone chain of a polymer, or to acyclic, alicyclic or aromatic radicals which are pendant to the backbone chain of the polymer, are novel compositions of matter. These ionomers vary in properties from water-soluble polyelectrolytes useful as thickening agents to thermoplastic elastomers which can be extruded, injection molded, vacuum formed, etc. at elevated temperatures. The elastomers are useful as specialty and general purpose rubbers.

32 Claims, No Drawings

ALKYL AMMONIUM IONOMERS

CROSS-REFERENCE TO RELATED APPLICATIONS

This instant application is a CIP application of Ser. No. 788,312 filed Apr. 18, 1977 based on P.M. CRL-181-73, now U.S. Pat. No. 4,102,876, issued July 25, 1978.

BACKGROUND OF THE INVENTION

1. Field of the Invention

This invention relates to ionic polymers. More particularly, this invention relates to ammonium salts of anionic polymers, i.e. polymers containing covalently bound negatively charged groups. Most particularly, this invention is concerned with novel compositions of matter comprising certain higher alkyl ammonium salts or quaternary polyammonium salts of polymers having incorporated therein one or more covalently bonded anionic radicals selected from the group comprising sulfonate, carboxylate and phosphonate radicals.

The particular ammonium salts of this invention may be schematically represented as:

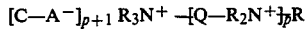  1.

wherein C is one of a plurality of carbon atoms comprising a portion of the polymer backbone chain of carbon atoms or is in an acyclic, alicyclic or aromatic radical which is pendant to the backbone chain and wherein the C is in a single polymer molecule; $A^-$ is an anionic radical, preferably a sulfonate group, covalently bonded to one or more of the C carbon atoms; and wherein the R groups represent substituents of the nitrogen atom(s) which are each independently selected from the group comprising hydrogen or $C_1$ to $C_{50}$ straight and branched chain acyclic, alicyclic, aryl, alkylaryl, and arylalkyl radicals and substituted functional derivatives thereof, wherein at least one of the R groups is selected from the group comprising $C_{12}$ to $C_{50}$ straight and branched chain acyclic, alicyclic, aryl, alkylaryl, and arylalkyl radicals and substituted functional derivatives thereof, and wherein each Q is independently selected from the group comprising $C_1$ to $C_{40}$ divalent straight and branched chain alkylene cycloalkylene, arylene, dialkylene-arylene radicals and substituted functional derivatives thereof and $-(CHY)_n-Z_m-(CHY)_n$, wherein Z is a hetero atom selected from the group consisting of oxygen and sulfur, m is zero or one, Y is hydrogen or said $C_1$ to $C_{50}$ radicals or substituted functional derivatives of the radicals and n is an integer of from 1 to 10, wherein p is from zero (for a monoammonium counterion) to about 10, more preferably zero to about 4, and most preferably zero or one, and wherein the ammonium counterion at least partially neutralizes said anionic acid radicals.

Other sulfonated salts of the instant invention are represented by the formula:

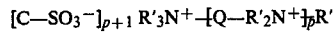  2.

wherein C is one of a plurality of carbon atoms comprising a portion of the polymeric backbone chain of carbon atoms or is in an acyclic, alicyclic or aromatic radical which is pendant to the backbone chain and wherein the C is in a single polymer chain, the $-SO_3^-$ groups are covalently bonded to one or more of the C carbon atoms in one or more of the polymeric backbone chains wherein each Q is independently selected from the group comprising $C_1$ to $C_{40}$ divalent straight and branched chain alkylene cycloalkylene, arylene, dialkylene-arylene radicals and substituted functional derivatives thereof and $-(CHY)_n-Z_m-(CHY)_n$, wherein Z is a hetero atom selected from the group consisting of oxygen and sulfur, m is zero or one, Y is hydrogen or said $C_1$ to $C_{50}$ radicals or substituted functional derivatives of the radicals and n is an integer of from 1 to 10, wherein p is from one (for a diammonium counterion) to about 10, more preferably one to about 4, and most preferably one, and wherein the R' groups are each independently selected from the group comprising $C_1$ to $C_{11}$, preferably $C_1$ to $C_4$, most preferably $C_1$ straight and branched chain acyclic, alicyclic, aryl, alkylaryl and arylalkyl radicals and substituted functional derivatives thereof.

For example, in formulas (3) and (4) below, diammonium and triammonium salts of formula 2 (p equal to 1 and 2 in formula (2)) are schematically represented as:

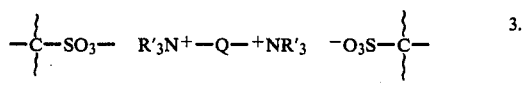  3.

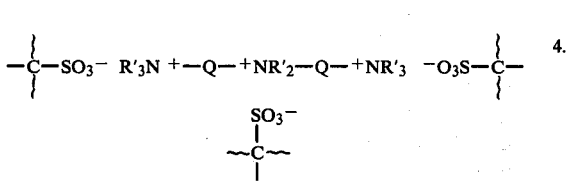  4.

where the symbols have the same meanings as in formula 2.

Using sulfonated polymers as the most preferred example of the anionic polymers of this invention, the ionically cross-linked ionomers of this invention may be readily prepared from the sulfonate precursor, for example a free sulfonic acid, by direct neutralization, either in bulk or in solution with an alkyl ammonium hydroxide wherein the cation is selected from one of the specified classes, or by a primary, secondary or tertiary amine from one of the specified classes, or by a combination of these neutralizing agents. Another means of preparation is by double decomposition (metathesis) of a salt of the sulfonic acid with an alkyl ammonium salt of an acid which is weaker (i.e. has a lower/$pK_a$) than the sulfonic acid, or by double decomposition in a multiphase fluid medium in which the salt of the displaced counterion is selectively removed from the phase containing the polymer to a phse in which the ammonium ionomer is substantially insoluble.

The properties and utility of the ionic salts of this invention vary over a wide range depending on the structure of the anionic polymer, the average molecular weight and molecular weight distribution, the degree of neutralization of the anionic groups in the polymer, the mole concentration of the alkyl ammonium salt groups in the polymer, and in particular, the type and variety of the substituents attached to the nitrogen. The ionic salts can range from water-soluble polyelectrolytes useful as adhesives and thickening agents to elastomers or hard resins which are thermoplastic at elevated temperatures permitting the products to be extruded, injection molded, vacuum formed and sheeted.

A particularly useful form for an ionomer is a water-insoluble elastomer which can be melt fabricated and then used without curing, and which can subsequently be reprocessed at elevated temperature since the ionomer does not contain permanent crosslinks.

2. Description of the Prior Art

Polymers containing anionic groups and their metal salts, prepared either by covalently appending anionic groups to a preformed polymer, as for example, by sulfonation or grafting of anionic monomers, or prepared by the mono or interpolymerization of monomers having acid moieties are old in the art.

U.S. Pat. No. 3,642,728 discloses sulfonated elastomer polymers which can be neutralized with organic amines having $C_1$ to $C_{30}$ carbon atoms. This broad disclosure of organic amines encompasses systems which fail to provide sulfonated elastomeric systems which are capable of being readily extruded into high performance elastomeric articles and which are limited to slower and less economical processes such as compression molding. The sulfonated polymers neutralized with the higher alkyl ammonium substances which are represented in formula (1) of the instant invention quite unexpectedly exhibit substantially improved melt flow at processing temperatures thereby enabling the instant polymers to be readily processed through an extruder into high performance polymeric articles.

In contrast to the higher alkyl substituted sulfonated polymers represented by formula (1) of the instant invention, the quaternary di- and polyammonium neutralized sulfonated polymers represented in formula (2) of the instant invention tend to possess high tensile strengths, especially at elevated temperatures. These materials have particularly outstanding high temperature tensile properties when Q is a straight chain alkylene radical which contains from 4 to 30 carbon atoms, preferably 4 to 22 carbon atoms and most preferably 6 to 18 carbon atoms.

U.S. Pat. No. 3,836,511 discloses sulfonated elastomer polymers which are neutralized with lower alkyl amines. These amine-neutralized, sulfonated elastomers do not possess the improved melt processability and greater softness of the higher alkyl ammonium-neutralized, sulfonated elastomer of the instant invention.

Reference is also made to copending application U.S. Ser. No. 855,553, now U.S. Pat. No. 4,137,203, issued Jan. 30, 1979, which contains a comprehensive prior art survey on ionomers.

SUMMARY OF THE INVENTION

This invention describes the preparation and utility of novel ionic polymers comprising alkyl ammonium, diammonium, and polyammonium salts of polymers having one or more anionic groups covalently bonded to a carbon atom comprising the polymer. Preferred anionic groups are sulfonate, carboxylate and phosphonate groups. The most preferred anionic group is a sulfonate group.

DESCRIPTION OF THE PREFERRED EMBODIMENTS

I. Sulfonate Polymers

Polymers having sulfonic acid groups covalently bonded to carbon atoms which comprise a portion of the polymer can be prepared by the sulfonation of a pre-formed hydrocarbon polymer by sulfonating or grafting reagents, or by the homopolymerization or interpolymerization of a monomer incorporating a sulfonic acid group or salt of a sulfonic acid. As used herein the term "interpolymer" denotes a polymer comprising more than one monomer, e.g. copolymer, terpolymers, etc. in which the arrangement of the monomer moieties may be random, alternating, block, graft, stereoregular and the like. Suitable non-limiting examples are grouped as follows:

A. Pre-Formed Polymers a. Homopolymers and interpolymers of one or more acyclic and alicyclic mono-olefins in which the polymers are essentially free of unsaturation (except for chain-end unsaturation) prepared with the aid of cationic, free-radical, alkali metal anionic, or Ziegler-Natta catalysts. Non-limiting examples include homopolymers and interpolymers of $C_2$ to $C_{18}$ olefins such as ethylene, propylene, isobutene, butene-1, pentene-1, hexene-1, 4-methylpentene-1, cyclopentene, bicyclo(2,2,1) 2-heptene, dodecene-1 and octadecene-1. Commercially available polymers in this group are polyethylene, polypropylene, ethylenepropylene rubber (EPR) and polyisobutylene.

b. Homopolymers and interpolymers of one or more alkenyl aromatic hydrocarbon monomers and substituted derivatives thereof having the general formulae Ar—C(R)=CHR' and Ar—CHR—CH=CH$_2$ wherein Ar is a monovalent sulfonatable aromatic radical and R and R' are independently selected from the group consisting of hydrogen and a methyl radical. Non-limiting examples of monomers which can be polymerized with the aid of a variety of catalyst systems to yield polymers which are suitable for the practice of this invention include: styrene, α-methyl styrene, propenyl benzene, allyl benzene, vinyl toluene, vinyl naphthalene and vinyl ethylbenzene.

c. Interpolymers of one or more $C_4$ to $C_{10}$ conjugated diolefins with one or more $C_8$ to $C_{12}$ vinyl aromatic hydrocarbons. Non-limiting examples include: copolymers of 1,3-butadiene with styrene, e.g. SBR rubber and graft polymers of styrene on polybutadiene.

d. Random interpolymers of one or more $C_8$ to $C_{12}$ vinyl aromatic hydrocarbons comprising about 40 to 60 weight percent of the vinyl aromatic with one or more $C_4$ to $C_{10}$ Type III mono-olefins. Non-limiting examples include the PARAPOL S resins comprising interpolymers of styrene and isobutylene.

e. Random elastomeric interpolymers of one or more $C_4$ to $C_{10}$ conjugated diolefins with one or more $C_4$ to $C_{10}$ Type III mono-olefins. Non-limiting examples include the family of BUTYL rubbers comprising interpolymers of isobutylene with butadiene, isoprene, piperylene, 1,3-hexadiene, 2,3-dimethyl-1,3-butadiene and cyclopentadiene.

f. Homopolymers and interpolymers of one or more $C_{10}$ acyclic and alicyclic monoterpenes and $C_{15}$ sesquiterpenes prepared with the aid of cationic, Ziegler-Natta and free-radical (e.g. gamma radiation) catalysts. Non-limiting examples of suitable monomers include: β-pinene, dicyclopentadiene, vinyl cyclohexane, dipentene, myrcene, ocimene and β-farnesene.

g. Homopolymers and interpolymers of one or more $C_4$ to $C_{10}$ conjugated diolefins. Non-limiting examples of suitable monomers include: 1,3-butadiene; isoprene; piperylene; 2,3-dimethyl buta-1,3-diene; and cyclopentadiene. Enchainment, using a variety of catalysts for the polymerization, e.g. alkali metal anionic and Ziegler-Natta catalysts includes 1,4-cis-, 1,4-trans-, 1,2- and 3,4-types of addition and random mixtures thereof.

Non-limiting examples of commercially available polymers include: natural rubber and synthetic cis-1,4-polybutadiene and cis-1,4-polyisoprene.

h. Random interpolymers of one or more Type I $C_2$ to $C_{18}$ mono-olefins and one or more $C_6$ to $C_{12}$ acyclic or alicyclic non-conjugated diolefins. Non-limiting examples of commercially available EPDM polymers include: terpolymers of ethylene, propylene and 1,4-hexadiene (NORDEL); terpolymers of ethylene, propylene and 5-ethylidene-2-norbornene (VISTALON) and ethylene, propylene and dicyclopentadiene (DUNLOP).

Olefin types are in accordance with the Schmidt and Boord Classification, J.A.C.S. 54, 751 (1932).

B. Polymers From Monomers Incorporating Sulfonic Acids

While the range and variety of monomers which incorporate sulfonic acid groups or their salts is not large at the present time, the use of these monomers permit the preparation of a variety of homopolymers and interpolymers that cannot be easily prepared by direct sulfonation of pre-formed polymers. Non-limiting examples of monomers incorporating sulfonic acids or their salts include: vinyl sulfonic acid; allyl sulfonic acid; methallyl sulfonic acid; 2-allyl oxyethane sulfonic acid; 2-hydroxy-3-allyl oxy propane sulfonic acid and styrene sulfonic acid. Vinyl sulfonic acid readily forms a water-soluble homopolymer and interpolymers with acrylonitrile, acrylic acid amide, vinyl acetate, acrylic acid esters and N-vinyl pyrrolidone, using a variety of catalyst systems. Styrene sulfonic acid readily polymerizes to yield a water-soluble polymer. The above monomers or their salts are preferably interpolymerized with hydrocarbons, to provide the polymeric sulfonic acids or their salts. The use of ammonium sulfonate monomers directly provide the novel compositions of this invention.

C. Sulfonation of Pre-Formed Polymers

Processes for the sulfonation of hydrocarbon polymers which are: (a) essentially free of olefinic unsaturation except for chain-end unsaturation, or (b) possess a measurable degree of olefinic unsaturation which may be in the polymer backbone chain of carbon atoms or is in an acyclic alkenyl or alkylidene radical or alicyclic radical which is pendant to the backbone chain of carbom atoms, or (c) possess aryl or arylene radicals which comprise the backbone chain of carbon atoms or are pendent to the backbone chain of carbon atoms are old in the art.

Polymers which are free of unsaturation but have a measure of chain branching such as polyethylene, polypropylene. polyisobutylene and EPR rubbers may be sulfonated in solution by means of $SO_2$ and $O_2$ with the aid of a free-radical initiator (Sulfoxidation Reaction), or sulfochlorinated in solution by means of $SO_2$ and $Cl_2$ with the aid of a free-radical initiator (Reed Reaction) followed by hydrolysis of the sulfonyl chloride to the free sulfonic acid or a salt of the sulfonic acid, or by means of complexes or coordination compounds of $SO_3$ with Lewis bases such as triethyl phosphate as disclosed in U.S. Pat. No. 3,205,285 which is herein incorporated by reference. The same reagent has been disclosed in U.S. Pat. Nos. 3,072,618 and 3,072,619 for the sulfonation of polystyrene and in U.S. Pat. No. 3,432,480 for the sulfonation of cis-1,4-polybutadiene. The above three patents and U.S. Pat. No. 3,642,728 which discloses a variety of complexing agents for the sulfonation of nonaromatic polymers such as BUTYL rubber are hereby incorporated by reference. U.S. Pat. No. 3,836,511 which discloses the sulfonation of unsaturated elastomers using acetyl sulfate is also incorporated by reference.

The sulfonations are carried out in solution in an inert hydrocarbon solvent such as hexane, heptane or isooctane, or chlorinated solvents such as ethylene dichloride or chlorobenzene at temperatures in the range of about $-40°$ C. to $100°$ C. depending on the reactivity of the sulfonation reagent employed.

Sulfonated polymers suitable for the practice of this invention include those having sulfur contents as high as 29.7 wt. % in the case of a homopolymer of vinyl sulfonic acid or ~17.2 wt. % in the case of a homopolymer of styrene sulfonic acid and as low as 0.1 wt. % in the case of a sulfonated polyisobutylene or polypropylene. Ionomers which are melt fabricated are most useful when they have a concentration of ionic groups which is between 0.1 and 8 mole percent (based on the monomer units of the polymer), more preferably about 0.2 to about 6, most preferably 0.4 to about 3 since at concentrations below 0.1 mole percent the effect of the ionic groups on the physical properties tends to be slight, while above 8 mole percent the ionomer tends to become difficult to melt fabricate.

Polymers containing sulfonate groups and in addition containing other anionic groups either on the same polymer molecule or on different polymer molecules are also included in this invention.

II. Other Anionic Groups

For the higher alkyl monoammonium salts specified in this invention carboxylate and phosphonate polymers are also useful. Of these two classes of polymers containing anionic groups, carboxylate containing polymers are preferred.

A wide variety of polymers having one or more carboxylic acid or phosphonic acid groups covalently linked to carbon atoms comprising the polymer which are suitable for the preparation of the specified alkyl ammonium ionomers of this invention have been described in the patent and general chemical literature. Some polymers containing carboxylate or phosphonate groups which are particularly useful for the preparation of ionically cross-linked elastomers have been reviewed in "Ionic Polymers", referenced above and by Brown et al.; Rubber Chem. & Technol., 28, 937 (1955); Boguslavskii; Soviet Rubber Technol., 18, 4 (1959); and Brown; Rubber Chem. & Technol., 36, 931 (1963). Non-limiting examples of useful polymers include interpolymers of acrylic and methacrylic acids with olefins and conjugated diolefins.

III. Ammonium Counterions

The ammonium counterions of this invention were specified in the above identified formulas (1) and (2). In the case of the ammonium cations of formula (1) within the specifications of this formula, it is preferred that the four substituents of the nitrogen atom be hydrogen or an R group having about 1 to about 30 carbon atoms, wherein the R group is selected from the group comprising straight or branched chain acyclic, alicyclic, aryl, alkylaryl and arylalkyl groups, and more hydrogen or an R group having one to about 26 carbon atoms, wherein at least one substituent is an R group having 12 to about 50 carbon atoms, preferably about 16 to about 30 carbon atoms, and most preferably about 16 to about 26 carbon atoms.

In the case of the di- or polyammonium quaternary cations of formula (2), it is preferred that the R' groups be alkyl groups containing from one to four carbon atoms, more preferably one or two carbon atoms and most preferably one carbon atom.

The preparation of halide salts and hydroxides of the ammonium cations specified in this invention is generally known in the prior art.

A partial list of some ammonium compounds which are suitable as starting materials for preparing the compositions of this invention is given below.

A. Some Ammonium Salts and Amines Having at least One Substituent Containing a $C_{12}$ to $C_{50}$ Alkyl Group 1. Quaternary higher monoalkyl ammonium salts. Some examples are coco trimethyl ammonium chloride, docosyl trimethyl ammonium chloride, oleyl trimethyl ammonium chloride, stearyl triethyl ammonium bromide, eicosyl diethyl methyl ammonium sulfate, tetradecyl dimethyl benzyl ammonium chloride, hydrogenated tallow di-2-hydroxyethyl methyl ammonium chloride and octadecenyl methyl imidazolinium chloride. Monoalkyl trimethyl ammonium salts are preferred.

2. Quaternary higher dialkyl ammonium salts. Some examples are didodecyl dimethyl ammonium chloride, hydrogenated ditallow ammonium chloride, dodecyl stearyl propyl ethyl ammonium sulfate and dicoco 2-hydroxyethyl methyl ammonium chloride. Dialkyl dimethyl ammonium salts are preferred.

3. Quaternary higher trialkyl ammonium salts. Some examples are triundecylmethyl ammonium bromide and tridodecyl benzyl ammonium iodide. Trialkyl methyl ammonium salts are preferred.

4. Quaternary higher tetraalkyl ammonium salts. An example is tetradodecyl ammonium iodide.

5. Tertiary higher alkyl amines. Some examples are coco dimethyl amine, tetracosyl dimethyl amine, didoceyl methyl amine, pentaethoxylated tallow amine stearyl diethyl amine, tridodecyl amine, and didocyl benzyl amine. Tertiary higher alkyl amines containing two or one methyl group(s) are preferred.

6. Secondary higher alkyl amines. Some examples are didoecyl amine, decyl docosyl amine, hexadecyl methyl amine, docosyl propyl amine and t-octadecyl hydroxyethyl amine. Higher alkyl methyl amines are preferred.

7. Primary higher alkyl amines. Some examples are stearyl amine, dodecyloxypropyl amine, dodecylthiopropyl amine, and lauryl amine.

8. Higher alkyl diamines having primary, secondary and/or tertiary amino groups. Some examples are octadecyl ethylene diamine, dodecyl tetramethyl decamethylene diamine, tetradecyl xylene diamine and bis-dodecyl piperazine.

9. Higher alkyl triamines having primary, secondary and/or tertiary amino groups such as docosyl ethylene triamine, tris-hexadecyl methylamino cyclohexane.

10. Higher alkyl substituted polyamines such as derivatives of polyethylene imine, nitrilo bis-propylamine, and polyvinyl pyridine.

11. Higher alkyl substituted quaternary polyammonium compounds such as decamethylene bis-dodecyldimethyl ammonium dichloride.

B. Some Quaternary Polyammonium Salts

1. Quaternary diammonium compounds. Some examples are decamethylene bis-trimethyl ammonium dichloride, xylene bis-triethyl ammonium dichloride, butenylene bis-diethyl methyl ammonium dichloride, ethylene bis tribenzyl ammonium dibromide, and thio bis-propyl trimethyl ammonium dichloride. Hydrocarbylene bis-trimethyl ammonium compounds are preferred.

2. Quaternary triammonium compounds. Polymethyl dialkylene triammonium compounds are preferred. An example is octamethyl diethylene triamine.

3. Quaternary polyammonium compounds. Some examples are polymethyl polyethylene polyamine, polymethyl polybutenylene polyamine, methylated polyxylene polyamine and methylated polyvinyl pyridine. Polymethylated polyalkylene amines are preferred.

IV. Product Composition, Properties and Utility

The products of the instant invention were characterized by the general formulas (1) and (2) which were described above. Such polymers range in properties from watersoluble polyelectrolytes useful as thickening agents to thermoplastic elastomers which can be extruded, injection molded, vacuum formed, etc. at elevated temperatures. The elastomers are useful as specialty and general purpose rubbers.

Products which have a limited concentration of anionic groups covalently bonded to one or more of the carbon atoms comprising the polymer, when neutralized or partially neutralized with metal cations are generally referred to as ionomers. The acidity of the unneutralized anionic polymer may vary over a wide range; useful acidities being in the range from 0.1 to 200 milliequivalents of hydrogen per 100 grams of the anionic polymer. Such ionomers, when neutralized or partially neutralized with the ammonium cations specified in the instant invention (rather than with metal cations) are a preferred embodiment of this invention. In particular, such ionomers when based on an elastomeric backbone have applications as thermoplastic elastomers.

The plasticized ionomers of the instant invention can be readily compounded in conventional or plastic compounding equipment with additives which are selected from the group consisting essentially of fillers, processing oils, thermoplastic polymers, waxes, additional plasticizers, and pigments and mixtures thereof.

The following examples more fully illustrate the invention and demonstrate the contribution to the art.

EXAMPLE 1—PREPARATON OF QUATERNARY AMMONIUM HYDROXIDES

Four quaternary ammonium halides were obtained from the sources cited below and converted to the hydroxide form by the procedure described below. Dioctadecyldimethylammonium chloride, and octadecyltrimethylammonium chloride were purchased from Lachat Chemical Company. Decamethylene bis-trimethyl ammonium dibromide was purchased from City Chemical Company. Triethylocatadecylammonium bromide was prepared via quaternization of triethyl amine by octadecyl bromide.

In order to convert these halides to the hydroxide form, a percolation column having a height to diameter ratio of approximately 15:1 was packed with Amberlyst A-29, a commercially available anionic macroreticular ion-exchange resin marketed as the chloride salt by Rohm and Haas Co., Philadelphia, PA. The resin was converted to the hydroxide form by slowly passing about 6.5 bed volumes of a 10 wt. % aqueous solution of reagent grade sodium hydroxide downward through the bed, followed by distilled water until the effluent had a pH of 7.0. The water in the column and in the resin was then displaced by percolating about 15 volumes of anhydrous methanol downward through the column.

Each of the above four quaternary ammonium halides was dissolved in about 300 ml. of a solvent consisting of either anhydrous methanol or ethanol, or mixtures of these alcohols with either benzene or cyclohexane depending on the solubility characteristics of the particular halide. The various solutions which ranged in concentration from about 0.5 to 20 grams of halide per 300 ml. of solvent were percolated through a fresly prepared column of the hydroxide form of the ion exchange resin. The receiver for the percolated solution was blanketed with oxygen-free nitrogen then sealed and refrigerated until used. Just before use an aliquot of each solution was titrated with standard alkali in order to check the basicity.

In addition to the quaternary ammonium hydroxides which were prepared above, the following quaternary ammonium reagents were purchased in their hydroxide form from Southwestern Analytical Chemicals Company of Austin, Texas.

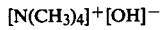
$[N(CH_3)_4]^+[OH]^-$

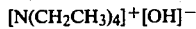
$[N(CH_2CH_3)_4]^+[OH]^-$

EXAMPLE 2—PREPARATION OF QUATERNARY AMMONIUM SALTS OF A SULFONATED EPDM

An EPDM available on a commercial scale (VISTALON) from Exxon Chemical Co., New York, New York, which comprised about 52 wt. % of ethylene, 43 wt. % of propylene and 5 wt. % of 5-ethylidene-2-norbornene and had a number average molecular weight of about 35,000 and a Mooney viscosity ML @ 100° C. (1+8 min.) of about 42 was sulfonated using acetyl sulfate in accordance with the method disclosed in U.S. Pat. No. 3,836,511. This free acid form of the sulfonated polymer was isolated from solution by steam stripping and dried on a warm two-roll mill. The product was stored at a temperature of −80° C. prior to use.

On the afternoon before the day of neutralization the free acid sulfonated polymer was cut into pieces and placed in a mixed solvent consisting of 95% toluene and 5% methanol by volume, to prepare a solution having a concentrated of 20 grams per liter. The mixture was stirred at room temperature overnight during which the polymer dissolved except for some small pieces of gel. In the morning the solution was filtered, and on titration of an aliquot was found to have an acidity of 0.39 milliequivalents of hydrogen per 100 ml.

The following quaternary ammonium hydroxides which were described in Example 1, were used to neutralize aliqots of the free acid sulfonated EPDM solution.

$[(C_{18}H_{37})_2N(CH_3)_2]^+[OH]^-$  1.

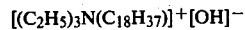
$[(C_2H_5)_3N(C_{18}H_{37})]^+[OH]^-$  2.

$[(CH_3)_3N(CH_2)_{10}N(CH_3)_3]^{++}(2[OH])^=$  3.

$[(C_{18}H_{37})N(CH_3)_3]^+[OH]^-$  4.

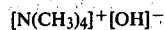
$[N(CH_3)_4]^+[OH]^-$  5.

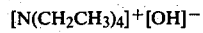
$[N(CH_2CH_3)_4]^+[OH]^-$  6.

The aliquots of the sulfonated EPDM solution were overbased with each of the quaternary ammonium hydroxide samples by the addition of 1.2 equivalents of the quaternary ammonium hydroxide per equivalent of sulfonic acid. The solutions were stirred under nitrogen for about 10 minutes, checked for basicity and slightly acidified with 2.5% acetic acid in methanol. Approximately 0.25 equivalents of the acetic acid were added per equivalent of acidity previously present in the solution. On neutralization some of the samples became cloudy. These cloudy solutions were clarified by the addition of toluene.

The products were recovered by precipitation with about 10 volumes of methanol, followed by settling and decantation of the supernatant liquid. In some cases where settling was incomplete, the solutions were centrifuged to consolidate the precipitate. Each of the recovered ionomers was overlaid with sufficient methanol to cover the product; then 0.1% by weight (based on the weight of recovered product) of a phenolic antioxidant (antioxidant 2246) was added to each sample and after standing overnight the methanol was decanted and the products dried at room temperature in a vacuum oven for several days.

While all of the sulfonate groups in the above and subsequent examples were completely neutralized, i.e., 100% neutralization, in certain instances it is desirable to partially neutralize the anionic groups present in the polymer, e.g. 5 to 95% with the quaternary ammonium hydroxides and leave some free acidity or complete the neutralization with a different counterion.

EXAMPLE 3—PHYSICAL PROPERTIES OF A SULFONATED EPDM CONTAINIG MONOVALENT QUATERNARY AMMONIUM COUNTERIONS

Test pads were molded from the ionomer materials prepared from Samples (1), (2), (4), (5) and (6) of Example 2. The test pads were compression molded at 160° C. using a preheat of 2 minutes and 3 minutes under pressure. Microtensile pads having a thickness of about 0.6 mm. and test regions measuring 2.54 m. in width and 12.7 mm. in length were cut from the pads.

Tensile strengths of the samples were measured at 25° C. and 100° C. with an Instron TM table model instrument, using a pulling speed of about 51 mm. per minute. In addition, the melt flow rates of the polymers were determined at 150° C., using the standard capillary and instrument specified in ASTM 1238-70. The weight of the probe plus the added weight was 12.5 kilograms. Flow rates were measured electronically as probe displacement per minute and these results were converted to grams per 10 minutes using a conversion factor. The results are given in Table I.

The first data column in Table I compares the melt flow rates at 150° C. of materials containing various monovalent quaternary ammonium counterions. It is apparent that the samples containing the long-chain counterions (Samples (1), (2) and (4)) have much higher melt flow and are softer than the short-chain counterions (Samples (5) and (6)).

TABLE I

Physical Properties of a Sulfonated EPDM Containing Various Monovalent Quaternary Ammonium counterions

| Sample Number | Structure of Counterion | Melt Flow Rate 150° C., 250 psi (g/10 min.) | Tensile Strength (psi) 25° C. | Tensile Strength (psi) 100° C. |
|---|---|---|---|---|
| 1 | $(C_{18}H_{37})_2 N^+ (CH_3)_2$ | 0.020 | 1700. | 70. |
| 2 | $(C_2H_5)_3 N^+ (C_{18}H_{37})$ | 0.030 | 1110. | 60. |
| 4 | $(C_{18}H_{37}) N^+ (CH_3)_3$ | 0.0085 | — | — |
| 5 | $N^+ (CH_3)_4$ | 0.0030 | — | — |
| 6 | $N^+ (C_2H_5)_4$ | 0.0045 | — | — |

Higher melt flow usually results in easier melt processing such as by extrusion or injection molding. Softer elastomers tend to be more appropriate for applications requiring high degrees of flexibility and low stiffness such as, for example, hot melt sealants for points which experience movement over time, or for gloves or shoe parts which require high flexibility or softness.

The difference in material properties which is caused by substituting quanternary ammonium counterions containing long-chain substituents for shorter chain substituents is more clearly illustrated by direct comparison of the compositions in Table I. Sample (6), containing the tetraethylammonium counterion gives a low melt flow rate of 0.0045 grams per 10 minutes. If one of the ethyl substituents of Sample (6) is replaced by an octadecyl substituent, Sample (2) is obtained. So, it is seen that the substitution of the long chain for the short chain results in an increase in melt flow by more than 6 times.

Sample (5), which contains the short methyl substituents on the counterion has a very low melt flow rate of 0.0030 grams per 10 minutes. Replacing one of the methyl groups with an octadecyl group gives Sample "4"; it can be seen from Table I that Sample "4" has almost 3 times the melt flow rate of Saple "5". If a second methyl substituent of Sample "5" is replaced by an octadecyl group, then Sample "1" is obtained. Sample "1" which contains the dioctadecyl dimethyl ammonium counterion has over six times the melt flow rate of the tetramethyl ammonium counterion. It is clear from these results that utilization long-chain substituents instead of short chains in a quaternary ammonium counterion results in materials having better processing (higher melt flow rates), and which are weaker and softer.

EXAMPLE 4—PHYSICAL PROPERTIES OF A SULFONATED EPDM NEUTRALIZED WITH POLYVALENT QUATERNARY AMMONIUM COUNTERIONS

A Divalent Quaternary Ammonium Counterion

Sample 3 of Example 2 was neutralized with the divalent cation $[(CH_3)_3N(CH_2)_{10}N(CH_3)_3]^{++}$. Test pads of this material were compression molded at 160° C., and microtensile pads (as described in Example 3) were cut from the pads. Tensile strengths were measured at 25° C. and 100° C. using a pulling speed of 51 mm. per minute. Also, the melt flow rate was measured using the method described in Example 3. The results were as follows:

| Sample Number "3" | |
|---|---|
| Structure of Counterion | $(CH_3)_3 N^+ (CH_2)_{10} N^+ (CH_3)_3$ |
| Melt Flow Rate at 150° C., 250 psi | 0.0035 g/10 minutes |

| -continued Sample Number "3" | |
|---|---|
| Tensile Strength at 25° C. | 1820. psi |
| Tensile Strength at 100° C. | 180. psi |

It is seen that this sample containing this divalent counterion has a melt flow rate which is less than one-half of the lowest fow rate long-chain counterion sample of Table I. In fact, the melt flow rate of this material is almost as low as the tetramethyl ammonium counterion sample (Sample "5" of Table I). In addition to its low melt flow rate and resultant high melt strength the divalent sample "3" has a higher tensile strength than the values listed for the long-chain counterion samples in Table I. In particular, Sample "3" has an excellent 100° C. tensile strength. This sulfonated material neutralized with this divalent ammonium counterion has a low melt flow rate and high tensile strength at elevated temperature even though its divalent counterion contains a fairly long (ten carbon) chain. Higher tensile strengths are obviously desirable in many applications which subject an article to high stresses, such as hoses or flexible industrial belts. High melt strength can be desirable in some fabrication processes such as blow molding or blow forming of thin flexible sheets.

B. A Polyvalent Quaternary Ammonium Counterion

Magnifloc 577C is a polyvalent quaternary ammonium chemical having the structure;

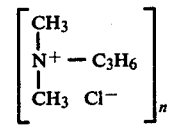

it has a relatively low degree of polymerization. It is manufactured by the American Cyanamid Company. This material was converted to the hydroxide using the procedures of Example 1, and it was used to neutralize a free acid sulfonated EPDM similar to that prepared in Example 2. A solution of this free acid containing 20g of polymer per liter of solvent had an acidity of 0.0057 milliequivalents of hydrogen per 100 ml. The neutralization procedure was similar to that used in Example 2. The isolation of the neutralized sulfonated polymer from the solution was as follows. The solution was steam-stripped to remove the solvents and precipitate the ionomer as a crumb for about one-half hour at which time the polymer had lost any tendency toward tackiness. The solids were filtered and washed in a Waring blender successively with methanol, distilled water and methanol. About 0.3 wt % of a hindered phenol antioxidant (antioxidant 2246) was added to the polymer before each wash. The polymer crumb was air dried at room temperature and further dried at room temperature under a vacuum.

For comparison with this polyvalent quaternary ammonium counterion, tetramethylammonium hydroxide was used for the polyvalent counterion. The neutralization and isolation procedures were similar to the ones used for the polyvalent counterion.

Tensile measurements and melt flow measurements were made on the samples containing the polyvalent and tetramethyl ammonium counterions using the methods described in Example 3. It was found that the sample containing the polyvalent quaternary ammonium counterion had a lower melt flow rate, and higher tensile strengths and modulii at both 25° C. and 100° C. as compared with the tetramethylammonium counterion. This demonstrates that a sulfonated polymer containing a polyvalent ammonium counterion can result in lower melt flow (and higher melt strength), and higher tensile strength and modulus than monovalent quaternary ammonium counterions of similar structure.

EXAMPLE 5 - PREPARATION AND PHYSICAL PROPERTIES OF A SULFONATED EPDM NEUTRALIZED WITH LONG CHAIN MONOVALENT AMINES

An EPDM havng a Mooney viscosity ML @ 100° C. (1+8 min.) of about 20 was used as the starting material for making a lightly sulfonated polymer. This EPDM contained about 5 wt. % of 5-ethylidene-2-norbornene and it contained about 50 wt. % of ethylene. It was sulfonated using acetyl sulfate in accordance with the method disclosed in U.S. Pat. No. 3,836,511, to produce the free acid form of the polymer. This material was isolated by steam stripping and dried on a warm mill. The dried polymeric sulfonic acid was dissolved at a concentration of 30 gram per liter in a mixed solvent consisting of 93% toluene and 7% methanol by volume. By titration of an aliquot, the polymer was found to have an acidity of 25 milliequivalents of acid per 100 g of polymer.

The acid form of the lightly sulfonated EPDM was divided into a number of portions, an different portions were neutralized in solution by the long chain amines listed below:

$C_{20,22}H_{41,45}NH_2$     7.

$C_{20,22}H_{41,45}N(CH_3)_2$     8.

$C_{20,22}H_{41,45})_2 N(CH_3)$     9.

$(C_{12}H_{25})_3 N$     10.

The double subscripts in Samples 7, 8 and 9 indicate that these materials contain a major amount of both $C_{20}H_{41}$ and $C_{22}H_{45}$ in the long-chain substituent(s). These amines also contain a minor amount of $C_{18}H_{37}$ in their long-chain substituent(s). These three samples were obtained from the Humko Sheffield Chemical Company; Sample 7 as Kemamine P-190-D, Sample 8 as Kemamine T-1902-D, and Sample 9 as Kemamine T-1901. Sample 10, tridodecylaine was obtained from the Eastman Chemical Company.

Portions of the free acid sulfonated EPDM solution were slightly overbased with each of the above long-chain amines by the addition of 1.15 equivalents of the long-chain amine per equivalent of sulfonic acid. The solutions were stirred at room temperature for about 20 minutes. The neutralized polymers were recovered from the solution by steam stripping and dried on a hot two-roll mill. Tensile pads were molded from the amine-neutralized sulfonated EPDM's in the manner described in Example 3, and microtensile test dumbbells were cut from the pads.

Tensile strengths of the sulfonated EPDM's neutralized with the four long-chain amines were measured at room temperature on an Instron TM table model apparatus at a pullng speed of 51 mm. per minute. In addition, melt flow rate measurements were made using the procedure described in Example 3. The results are shown in Table II.

TABLE II
PHYSICAL PROPERTIES OF A SULFONATED EPDM NEUTRALIZED WITH VARIOUS LONG CHAIN AMINES

| Sample Number | Neutralizing Agent | Melt Flow Rate 150° C. 250 psi(g/10 min.) | Tensile Properties at Room Temperature | | |
|---|---|---|---|---|---|
| | | | Strength (psi) | Elongation (%) | Initial Modulus (psi) |
| 7 | $C_{20,22}H_{41,45}NH_2$ | 0.044 | 1600 | 600 | 340 |
| 8 | $C_{20,22}H_{41,45}N(CH_3)_2$ | 0.7 | 975 | 840 | 300 |
| 9 | $(C_{20,22}H_{41,45})_2N(CH_3)$ | 1.9 | 735 | 795 | 275 |
| 10 | $(C_{12}H_{25})_3N$ | 2.1 | 220 | 1480 | 175 |

By comparing Samples 7 and 8 of Table II it is seen that substituting methyl groups for hydrogens (attached to the nitrogen atom) greatly increases the melt flow rate and thereby improves processability. This change also results in a softer material (lower modulus) and tends to reduce strength. In comparing Samples 8 and 9 of Table II it is observed that substituting a long chain in place of a short chain substituent further increases the melt flow rate, and further increases softness. The last sample 10, in Table II illustrates that the presence of additional long-chain substituents, $C_{12}$ in this case, can be more important in increasing melt flow and increasing softness then simply having a large amount of hydrocarbon in a lesser number of long chains; e.g., Sample 10 with three long chains but only 36 carbon atoms has greater melt flow and softness than Sample 9 with over 40 carbon atoms.

In order to determine the relative effects on physical properties of neutralizing an ionomer with an amine containing a long-chain substituent of twelve carbons or more as compared with an amine of corresponding structure but containing shorter substituents, a short-chain amine was utilized as a neutralizing agent. Tripropylamine, $N(C_3H_7)_3$, was obtained from Aldrich Chemical Company. It was used to neutralize a portion of the free acid sulfonated EPDM described earlier in this example and it was worked up in exactly the same manner as the materials neutralized with the long-chain amines, and tensile samples were prepared, and tensile and melt flow rate measurements were made.

The physical properties of the sulfonated EPDM neutralized with tripropylamine are presented in Table III. For comparision, results for an amine of similar form (three hydrocarbon substituents of the same structure) but having long (12-carbon) chain substituents are also shown in Table III. It is seen that changing the propyl substituents of Sample 11 to dodecyl substituents to get Sample 10 has a dramatic effect on melt flow rate, strength, softness (modulus), and elongation. The material neutralized with the amine containing the 12 carbon substituents (tridodecylamine) has over 5 times the melt flow rate of the sample neutralized with tripropylamine; also, Sample 10 is much softer and has much higher elongation and much lower tensile strength. The much higher melt flow rate and greater softness of the material neutralized with the long chain amine make it useful where high processing rates are desirable, such as in injection molding or extrusion. Also, these properties would be useful in caulking compounds and hot melt sealants.

TABLE III

COMPARISON OF A LONG CHAIN AMINE WITH A SHORTER CHAIN AMINE AS NEUTRALIZING AGENTS FOR A SULFONATED EPDM

| Sample Number | Neutralizing Agent | Melt Flow Rate 150° C. 250 psi (g/10 min.) | Tensile Properties at Room Temperature | | |
|---|---|---|---|---|---|
| | | | Strength (psi) | Elongation (%) | Initial Modulus (psi) |
| 11 | $(C_3H_7)_3N$ | 0.37 | 970 | 720 | 320 |
| 12 | $(C_{12}H_{25})_3N$ | 2.1 | 220 | 1480 | 175 |

Since many modifications and variations of this invention may be made without departing from the spirit or scope of the invention thereof, it is not intended to limit the spirit or scope thereof to the specific examples thereof.

What is claimed is:

1. Polymers having the general formula:

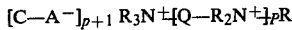

wherein C is one of a plurality of carbon atoms comprising a portion of the polymer backbone chain of carbon atoms or is in an acyclic, alicyclic or aromatic radical which is pendant to the backbone chain and wherein said C is in a single polymer molecule; $A^-$ is an anionic radical covalently bonded to one or more of said C carbon atoms; and wherein the R groups represent substituents of the nitrogen atom(s) which are each independently selected from the group comprising hydrogen or $C_1$ to $C_{50}$ straight and branched chain acyclic, alicyclic, aryl, alkylaryl, and arylalkyl radicals and substituted functional derivatives thereof, wherein at least one of the R groups is selected from the group comprising $C_{12}$ to $C_{50}$ straight and branched chain acyclic, alicyclic, aryl, alkylaryl, and arylalkyl radicals and substituted functional derivatives thereof, and wherein each Q is independently selected from the group comprising $C_1$ to $C_{40}$ divalent straight and branched chain alkylene, cycloalkylene, arylene, dialkylene-arylene radicals and substituted functional derivatives thereof and $-(CHY)_n-Z_m-(CHY)_n$, wherein Z is a hetero atom selected from the group consisting of oxygen and sulfur, m is zero or one, Y is hydrogen or said $C_1$ to $C_{50}$ radicals or substituted functional derivatives of said radicals and n is an integer of from 1 to 10, wherein p is from zero (for a monoammonium counterion) to about 10, and wherein said ammonium counterion at least partially neutralizes said anionic acid radicals.

2. Polymers of claim 1 wherein said polymer is an ionomer.

3. A polymer of claim 2 wherein said backbone polymer is an elastomer.

4. A polymer of claim 3 wherein said backbone polymer is an EPDM.

5. Polymers of claim 2 wherein said polymeric backbone is selected from the group consisting of:
(a) Homopolymers and interpolymers of one or more acyclic and alicyclic mono-olefins;
(b) Homopolymers and interpolymers of one or more alkenyl aromatic hydrocarbon monomers;
(c) Interpolymers of one or more $C_4$ to $C_{10}$ conjugated diolefins with one or more $C_8$ to $C_{12}$ vinyl aromatic hydrocarbons;
(d) Interpolymers of one or more $C_8$ to $C_{12}$ vinyl aromatic hydrocarbons with one or more $C_4$ to $C_{10}$ Type III mono-olefins;
(e) Elastomeric interpolymers of one or more $C_4$ to $C_{10}$ conjugated diolefins with one or more $C_4$ to $C_{10}$ Type III mono-olefins;
(f) Homopolymers and interpolymers of one or more $C_{10}$ acyclic and alicyclic monoterpenes and $C_{15}$ sesquiterpenes;
(g) Homopolymers and interpolymers of one or more $C_4$ to $C_{10}$ conjugated diolefins; and
(h) Interpolymers of one or more $C_2$ to $C_{18}$ Type I mono-olefins and one or more $C_6$ to $C_{12}$ acyclic and alicyclic non-conjugated diolefins.

6. Polymers of claim 2 wherein said ionomer is water insoluble.

7. Polymers of claim 2 wherein said polymeric backbone is a polyethylene.

8. Polymers of claim 2 wherein said polymeric backbone is a polypropylene.

9. Polymers of claim 2 wherein said polymeric backbone is an interpolymer of ethylene and propylene.

10. Polymers of claim 2 wherein said polymeric backbone is an EPDM elastomer.

11. Polymers of claim 2 wherein said polymeric backbone is a Butyl rubber.

12. A composition comprising the polymer of claim 1 and a filler.

13. A composition comprising the polymer of claim 1 and an oil.

14. A composition according to claim 12 and an oil.

15. A composition comprising the polymer of claim 1 and another polymer.

16. Polymers according to claim 1 further including an extender.

17. Sulfonated polymers neutralized with di- or polyammonium quaternary counterions having the general formula:

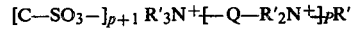

wherein C is one of a plurality of carbon atoms comprising a portion of the polymeric backbone chain of carbon atoms or is in an acyclic, alicyclic or aromatic radical which is pendant to the backbone chain and wherein said C is in a single polymer chain, the $-SO_3-$ groups are covalently bonded to one or more of said C carbon atoms in one or more of said polymeric backbone chains wherein each Q is independently selected from the group comprising $C_1$ to $C_{40}$ divalent straight and branched chain alkylene cycloalkylene, arylene, dialkylene-arylene radicals and substituted functional derivatives thereof and $-(CHY)_n-Z_m-(CHY)_n$, wherein Z is a hereto atom selected from the group consisting of oxygen and sulfur, m is zero or one, Y is hydrogen or said $C_1$ to $C_{50}$ radicals or substituted functional derivatives of said radicals and n is an integer of from 1 to 10, wherein p is from one (for diammonium counterion) to about 10, and wherein the R' groups are each independently selected from the group comprising $C_1$ to $C_{11}$ straight and branched chain acyclic, alicyclic, aryl, alkylaryl and arylalkyl radicals and substituted functional derivatives thereof.

18. Polymers of claim 17 wherein said polymer is an ionomer.

19. A polymer of claim 18 wherein said backbone polymer is an elastomer.

20. A polymer of claim 19 wherein said backbone polymer is an EPDM.

21. Polymers of claim 18 wherein said polymeric backbone is selected from the group consisting of:
  (a) Homopolymers and interpolymers of one or more acyclic and alicyclic mono-olefins;
  (b) Homopolymers and interpolymers of one or more alkenyl aromatic hydrocarbon monomers;
  (c) Interpolymers of one or more $C_4$ to $C_{10}$ conjugated diolefins with one or more $C_8$ to $C_{12}$ vinyl aromatic hydrocarbons;
  (d) Interpolymers of one or more $C_8$ to $C_{12}$ vinyl aromatic hydrocarbons with one or more $C_4$ to $C_{10}$ Type III monoolefins;
  (e) Elastomeric interpolymers of one or more $C_4$ to $C_{10}$ conjugated diolefins with one or more $C_4$ to $C_{10}$ Type III mono-olefins;
  (f) Homopolymers and interpolymers of one or more $C_{10}$ acyclic and alicyclic monoterpenes and $C_{15}$ sesquiterpenes;
  (g) Homopolymers and interpolymers of one or more $C_4$ to $C_{10}$ conjugated diolefins; and
  (h) Interpolymers of one or more $C_2$ to $C_{18}$ Type I mono-olefins and one or more $C_6$ to $C_{12}$ acyclic and alicyclic non-conjugated diolefins.

22. Polymers of claim 17 wherein said polymeric backbone is polyethylene.

23. Polymers of claim 17 wherein said polymeric backbone is polypropylene.

24. Polymers of claim 17 wherein said polymeric backbone is an interpolymer of ethylene and propylene.

25. Polymers of claim 17 wherein said polymeric backbone is Butyl rubber, said Butyl rubber comprising interpolymers of isobutylene with butadiene isoprene, piperylene, 1,3-hexadiene, 2,3-dimethyl-1,3-butadiene and cyclopentadiene.

26. Polymers of claim 17 wherein said polymeric backbone is an EPDM elastomer.

27. Polymers of claim 17 wherein said $SO_3^-$ groups are in a concentration range of from about 0.2 to about 8 mole %.

28. A composition comprising the polymer of claim 17 and a filler.

29. A composition comprising the polymer of claim 17 and an oil.

30. A composition according to claim 28 further including an oil.

31. A composition comprising the polymer of claim 17 and another polymer.

32. A composition comprising the polymer of claim 17 and an extender.

* * * * *